April 27, 1965
W. C. LEEPER, JR
3,180,427
LAWN CONDITIONER
Filed Nov. 22, 1963
2 Sheets-Sheet 1
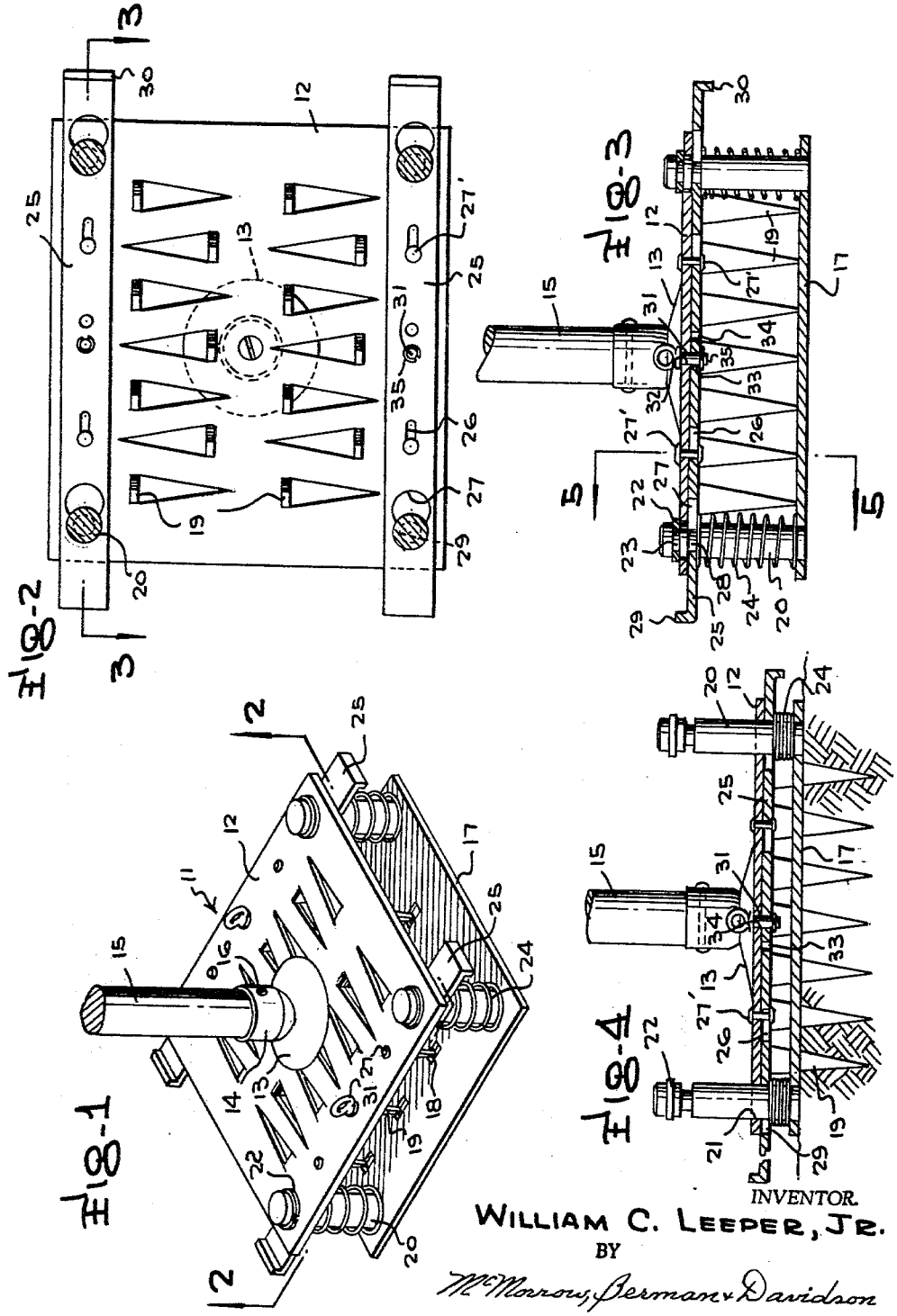
INVENTOR.
WILLIAM C. LEEPER, JR.
BY
McMorrow, Berman & Davidson
ATTORNEYS

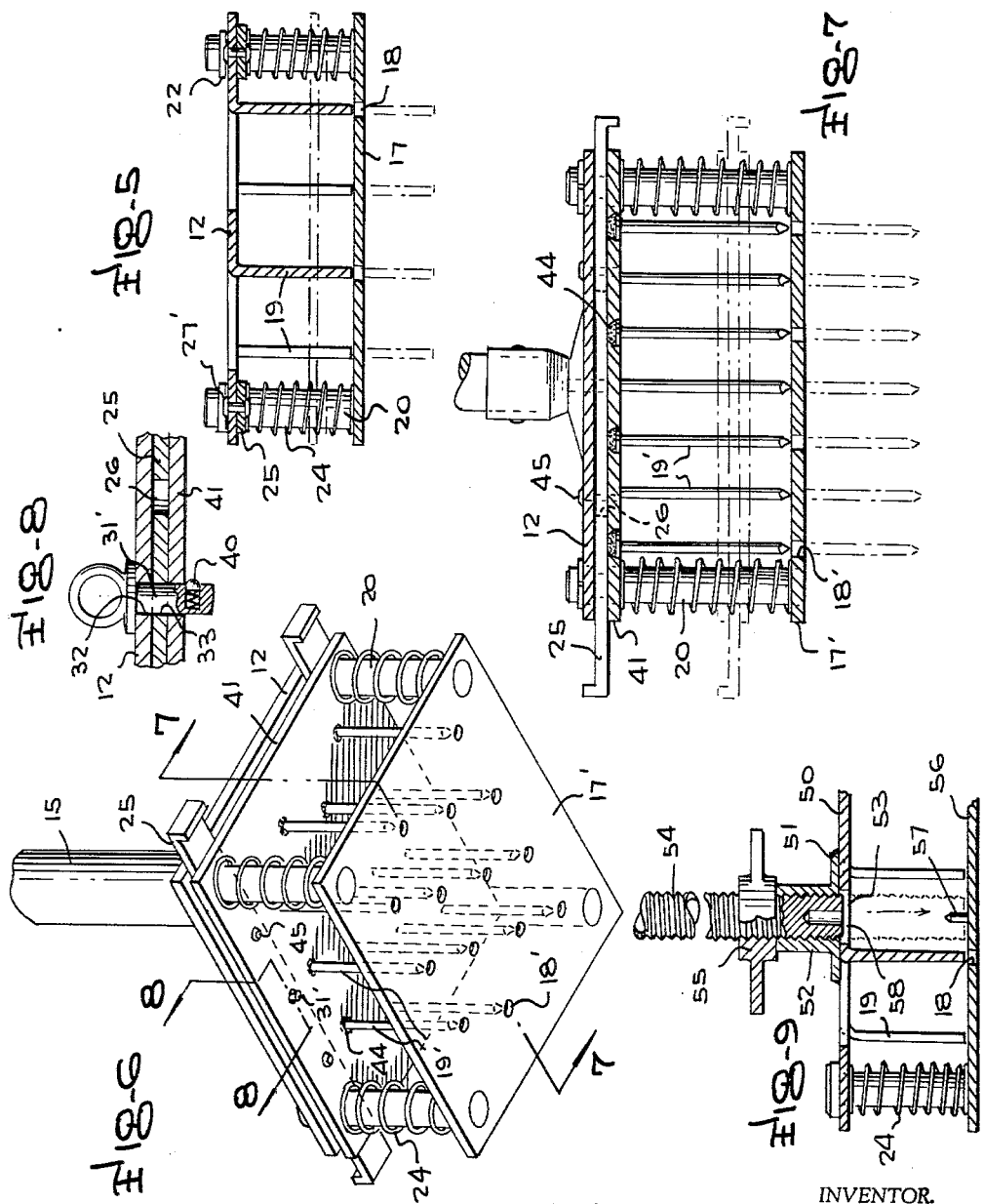

3,180,427
LAWN CONDITIONER
William C. Leeper, Jr., 134 W. 4th St., Lewistown, Pa.
Filed Nov. 22, 1963, Ser. No. 325,554
2 Claims. (Cl. 172—21)

This invention relates to garden tools, and more particularly to a combination soil tamper and aerator.

A main object of the invention is to provide a novel and improved combination soil tamper and aerator for use in treating lawns or other land areas, the device being arranged so that a lawn or other land area may be effectively tamped and may be aerated, when desired, without excessive disturbance or tearing of the sod, as often occurs when a conventional roller-type aerator is employed.

A further object of the invention is to provide an improved lawn treatment tool for tamping and aerating a lawn, the tool being simple in construction, being easy to use, and being readily convertible for either tamping or aerating the soil, as desired.

A still further object of the invention is to provide an improved tool for treating lawns or other land areas to aerate the soil or cultivate same and to prepare it for seeding, the tool being inexpensive to manufacture, being sturdy in construction, being relatively compact in size, and being easy to manipulate.

A still further object of the invention is to provide an improved tool for either tamping or aerating the soil on lawns or other land areas, the tool being provided with means for penetrating the soil to create perforations therein without excessive disturbance or tearing of adjacent sod masses, the tool being further provided with means for quickly converting the same from an aerating implement to a tamping implement.

Further objects and advantages of the invention will become apparent from the following description and claims, and from the accompanying drawings, wherein:

FIGURE 1 is a perspective view of the head portion of an improved combination soil tamper and aerator constructed in accordance with the present invention.

FIGURE 2 is a horizontal cross sectional view taken substantially on the line 2—2 of FIGURE 1.

FIGURE 3 is a vertical cross sectional view taken substantially on the line 3—3 of FIGURE 2.

FIGURE 4 is a vertical cross sectional view similar to FIGURE 3 but showing the tool converted for use as an aerating implement, namely, arranged with the main plate thereof released for downward movement relative to the bottom guide plate thereof.

FIGURE 5 is a vertical cross sectional view taken substantially on the line 5—5 of FIGURE 3.

FIGURE 6 is a bottom perspective view of a modified form of combination soil tamper and aerator according to the present invention.

FIGURE 7 is a vertical cross sectional view taken substantially on the line 7—7 of FIGURE 6.

FIGURE 8 is an enlarged cross sectional detail view taken substantially on the line 8—8 of FIGURE 6.

FIGURE 9 is a fragmentary vertical cross sectional view taken through a portion of the head of a further modified form of combination soil tamper and aerator constructed in accordance with the present invention.

Referring to the drawings, and more particularly to FIGURES 1 to 5 inclusive, 11 designates an improved combination soil tamper and aerator according to the present invention. The combination soil tamper and aerator comprises a horizontal main support plate 12 which is of any suitable shape, for example, which is generally rectangular, as shown in FIGURE 1. Rigidly secured centrally to the main plate 12 is a connecting bracket 13 formed with an upstanding socket or collar 14 adapted to receive the lower end of a suitable operating member such as a handle 15. The handle 15 may be secured in the socket 14 in any suitable manner, for example, by means of a transversely extending rivet 16 passing diametrically through the socket 14 and through the lower end portion of the handle 15.

Designated at 17 is a horizontal guide plate similar in shape to the main plate 12, said guide plate being located subjacent to and parallel to the main plate, as shown in FIGURE 1. The guide plate 17 is formed with a plurality of guide apertures 18 which are distributed substantially uniformly thereover, and the main plate 12 is formed with a similar number of downwardly struck soil-penetrating prongs 19 which are vertically aligned with the apertures 18 and which may pass through said apertures when the main plate 12 moves downwardly relative to the guide plate 17. As shown in FIGURE 1, the apertures 18 may be in the form of generally rectangular slots to accommodate the generally rectangular cross sections of the prongs 19, said prongs being of generally triangular shape and tapering downwardly to relatively sharp points.

The guide plate 17 is resiliently connected in any suitable manner to the main plate 12 and preferably in a manner to guide the main plate 12 vertically so that it is maintained parallel to the guide plate 17. Thus, respective vertical upstanding post members 20 are rigidly secured to the corner portions of the guide plate 17, said post members extending upwardly through circular apertures 21 formed in the corner portions of the main plate 12, the circular apertures 21 being slightly larger than the circular cross sections of the upstanding post members 20 so as to allow said post members to be freely slidable in the apertures 21. The top ends of the post members 20 are provided with suitable abutment means engageable with the main plate 12 to limit downward movement of the guide plate 17 relative thereto, for example, stop collars or rings 22 are secured in annular grooves 23 provided in the top portions of the post members 20, as is clearly shown in FIGURE 3. Coiled springs 24 surround the respective post members 20, bearing between the guide plate 17 and the respective horizontal slidable lock bars 25 slidably connected to the bottom surfaces of the main plate 12 at opposite sides thereof, as will be presently described, whereby the springs 24 bias the guide plate 17 downwardly relative to the main plate 12, urging the stop rings 22 into abutment with the top surface of the main plate 12.

As above mentioned, respective lock bars 25, 25 are slidably connected to the bottom surfaces of the main plate 12 at opposite sides thereof. Thus, the lock bars 25 may be formed with longitudinal slots 26 through which extend rivets 27', the rivets passing through the main plate 12 and through the slots 26, slidably connecting the lock bars to main plate 12 but allowing longitudinal movement of the lock bars. The lock bars are formed with respective apertures 27 through which the post members 20 extend, said post members being formed with annular grooves 28 adapted to lockingly receive narrowed portions 29 of the apertures 27, whereby to lock the plate member 12 to the post members and to prevent vertical movement of said plate member 12 relative to the guide plate 17. As shown in FIGURE 2, the apertures 27 have relatively large circular main portions of sufficient size to provide clearance for the main body portions of the post members 20, so that when the lock bars are moved to positions such as that shown in FIGURE 4, the top plate 12 is released relative to the lock bars and may move vertically toward the guide plate 17.

The lock bars are provided at one end with upturned lugs 29 and at the other end with downturned lugs 30, providing gripping means for shifting the positions of the lock bars.

The lock bars 25 may be releasably locked in either of their two alternative positions, namely, either in the position of FIGURE 3 or in the position of FIGURE 4 by the provision of removable locking pins 31 received in apertures 32 formed in the top plate 12 and receivable selectively in either of longitudinally spaced apertures 33 and 34 provided in the lock bars. Thus, in the position of FIGURE 3, the lock 25 shown therein is locked in the position holding plate member 12 fixed relative to plate member 17, with the associated locking pin 31 engaged through the locking aperture 33 of the lock bar. In this position the narrowed slot portions 29 are engaged with the locking grooves 28 of the post members, thus locking the top plate 12 relative to said post members. In the position shown in FIGURE 4, the locking pin 31 shown therein is engaged through the locking aperture 34, locking the bar 25 in a position wherein the substantially circular larger portions of the apertures 27 register with the post members 20, allowing free downward movement of the main plate 12.

The locking pins 31 are provided with resilient locking rings 35 engageable in annular grooves formed in the bottom ends of the locking pins, the resilient rings 35 being readily removable to permit the pins 31 to be extracted whenever desired.

In operation, assuming that it is desired to aerate the soil, the locking bars 25 are moved to the positions of FIGURE 4 and locked therein by means of the pins 31. Under these conditions, when downward force is applied to the handle 15, the top plate 12 is free to move downwardly, and the prongs 19 pass downwardly through the apertures 18 and enter the soil, creating limited perforations therein, the perforations being relatively clean and the adjacent soil being held against tearing or excessive disturbance by the engagement of the guide plate 17 thereon, the springs 24 serving to exert downward spring force on the plate 17 to hold it firmly in contact with the soil. Thus, as shown in FIGURE 4, the guide plate 17 is held firmly against the soil while the prongs 19 are forced downwardly therethrough, creating the desired aerating apertures in the soil.

When it is desired to employ the tool for tamping the soil, for example, after seeding, the lock bars 25 are moved to the positions shown in FIGURE 3, namely, in the positions wherein the narrowed slot portions 29 are engaged in the grooves 28 of the post members, and the lock bars are then fastened in this position by means of the pins 31. The top plate 12 is then rigidly held stationary relative to the bottom plate 17, and the prongs 19 are held so that they are located above the bottom plane of the guide plate 17. This is clearly shown in FIGURE 3. The device can then be employed as a tamper.

Referring now to the form of the invention shown in FIGURES 6, 7 and 8, the guide plate, shown at 17' is formed with circular guide apertures 18', and the top plate 12 is provided with the depending sharpened pins 19' which are in vertical registry with the apertures 18', the pins 19' being rigidly secured to the top plate assembly 12 by welding, or the like. The locking pins for the lock bars 25, designated at 31', are provided with ball detents 40 at their lower portions, the ball detents being spring biased outwardly but being yieldable to allow the pins 31' to be inserted into locking positions, as shown in FIGURE 8. An auxiliary plate member 41, identical in shape to the top plate 12 is employed, the prongs 19' being rigidly secured at 44 to the auxiliary plate 41, as shown in FIGURE 7. The coiled springs 24 surround the post members 20 and bear between the guide plate 17' and the auxiliary plate 41, as is clearly shown in FIGURES 6 and 7. The rivets 45 extend through the top plate 12 and auxiliary plate 41 and pass through the longitudinal slots 26 of the lock bars 25. The rivets 45 thus rigidly secure the auxiliary plate 41 to the top plate 12 while allowing longitudinal sliding movement of the lock bars 25.

Referring now to the form of the invention shown in FIGURE 9, the top plate, shown at 50, is provided centrally with an annular bracket 51 rigidly secured thereto and including an upstanding internally threaded collar portion 52. The top plate 50 has a central aperture 53 registering with the internally threaded bore of collar portion 52, and a stud member 54 is threadedly engaged in the collar, the stud member being adapted to be threadedly engaged with an elongated handle or rod, not shown. A locking nut 55 is threadedly engaged on the stud member 54 to lock the stud member in either of two positions, namely, the position shown in FIGURE 9, in full line view, or in an alternate position, shown in dotted view in FIGURE 9, wherein the stud member is depressed so that it is in substantially abutting engagement with the bottom guide plate, shown at 56. The guide plate 56 has rigidly secured thereto an upstanding guide pin 57 which is registrable with a bottom guide bore 58 formed in the stud member 54, so that the stud member may be lowered to receive the pin 57, and may then be locked in position by tightening the lock nut 55. In the lowered position of the stud member 54, shown in dotted view in FIGURE 9, the top plate 50 is locked in fixed position relative to the bottom guide plate 56, thereby providing the tamping condition of the implement. With the stud member 54 elevated to the position shown in full line view in FIGURE 9, and locked in this position by tightening the lock nut 55, the implement is adjusted for aerating the soil, since under these conditions the top plate 50, provided with the depending prongs 19, may be depressed relative to the guide plate 56, whereby the prongs 19 may pass through the guide apertures 18 in said guide plate and may penetrate the soil, as in the form of the invention illustrated in FIGURE 1.

The soil tamping and aerating devices above described may be employed either manually, namely, by means of their operating handles 15, or may be mechanically operated by any suitable reciprocating driving means connected in place of the operating handle.

While certain specific embodiments of an improved combination soil tamper and aerator have been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A combination soil tamper and aerator comprising a horizontal main support plate, a stud member extending upwardly through and threadedly engaged in said main support plate, a guide plate subjacent and parallel to said main plate, said guide plate being formed with a plurality of guide apertures, depending soil-penetrating members rigid with said main plate and aligned with said apertures, means resiliently connecting said guide plate to said main plate, said stud member being at times engageable with said guide plate to hold the guide plate in a position where the soil-penetrating members are above the bottom plane of the guide plate, a lock nut on the stud member above the main support plate and being arranged to lock said stud member in its guide plate-engaging position, and an elongated handle directly connected to the stud member above said nut.

2. A combination soil tamper and aerator comprising a horizontal main support plate, an upstanding collar member centrally secured on said main support plate, a stud member extending upwardly through and threadedly engaged in said collar member, said support plate being formed with a guide bore located to receive said stud member, a guide plate subjacent and parallel to said main plate, said guide plate being formed with a plurality of guide apertures, depending soil-penetrating members rigid with said main plate and aligned with said apertures, means resiliently connecting said guide plate to said main plate, said stud member being at times engageable with said guide plate to hold the guide plate in a position where the soil-penetrating members are above the bottom plane of the guide plate, a lock nut on the stud member above the collar member and being engageable with said collar member to lock said stud member in its guide plate-engaging position, and an elongated handle directly connected to the stud member above said nut.

References Cited by the Examiner

UNITED STATES PATENTS

| | | | |
|---|---|---|---|
| 814,499 | 3/06 | Abraham | 172—245 |
| 1,183,653 | 5/16 | Kring | 111—99 |
| 1,965,177 | 7/34 | Finkl | 172—21 |
| 2,020,571 | 11/35 | Pick | 172—21 |
| 2,291,160 | 7/42 | Johnson | 172—247 |
| 2,476,084 | 7/49 | Cour | 172—247 X |
| 2,695,188 | 11/54 | Klausman et al. | 294—61 |

FOREIGN PATENTS

| | | |
|---|---|---|
| 911,922 | 4/46 | France. |
| 184,295 | 4/07 | Germany. |
| 661,698 | 11/51 | Great Britain. |

ABRAHAM G. STONE, *Primary Examiner.*